United States Patent [19]

Ma et al.

[11] Patent Number: 5,418,277

[45] Date of Patent: May 23, 1995

[54] AQUEOUS INK JET INKS CONTAINING FLUORINATED POLYMERS

[75] Inventors: Sheau-Hwa Ma, Chadds Ford, Pa.; Jose M. Rodriguez-Parada, Hockessin, Del.

[73] Assignee: E. I. Du Pont de Nemours and Company, Wilmington, Del.

[21] Appl. No.: 233,680

[22] Filed: Apr. 26, 1994

[51] Int. Cl.$^6$ .................. C08L 27/12; C09D 11/02
[52] U.S. Cl. .................. 524/520; 524/516; 524/517; 524/544; 524/608; 525/89; 526/248; 106/20 R; 106/20 D
[58] Field of Search ............ 524/544, 608, 548, 805, 524/516, 517, 520; 106/20 R, 20 D

[56] References Cited

U.S. PATENT DOCUMENTS

| | | | |
|---|---|---|---|
| 5,017,644 | 5/1991 | Fuller et al. | 106/20 |
| 5,019,166 | 5/1991 | Schwarz | 106/22 |
| 5,085,698 | 2/1992 | Ma et al. | 106/20 |
| 5,221,334 | 6/1993 | Ma et al. | 106/20 |

FOREIGN PATENT DOCUMENTS 4-170474  6/1992  Japan .

OTHER PUBLICATIONS

"Ethylenimine Polymers", S. Kobayasxhi, Prog. Polym. Sci., vol. 15, pp. 751–823, 1990.

*Primary Examiner*—Paul R. Michl
*Assistant Examiner*—Tae H. Yoon

[57] ABSTRACT

An aqueous dye or pigment ink particularly adapted for ink jet printing containing a fluorinated block copolymer prepared from a fluorinated oxazoline or oxazine. Resulting inks exhibit high print quality over a range of papers.

12 Claims, No Drawings

AQUEOUS INK JET INKS CONTAINING FLUORINATED POLYMERS

FIELD OF THE INVENTION

This invention relates to aqueous inks for ink jet printers, and, more particularly, to aqueous ink jet inks containing a polymer prepared from a fluorinated oxazoline or fluorinated oxazine.

BACKGROUND OF THE INVENTION

Ink jet printing is a non-impact printing process in which ink droplets are deposited on a substrate, such as paper or transparency film, in response to an electronic signal. Both dyes and pigments have been used as colorants in ink jet inks, with dyes generally offering superior colors as printed, and pigments generally providing superior light-fastness and durability of the printed images.

There are three primary attributes of ink jet inks: print quality, drying rate, and reliability. Print quality is primarily determined by optical density of the print, edge acuity, dot shape, and spray, if any. To a lesser degree, print quality is also determined by the printer mechanics such as resolution, drop volume, drop velocity, and the software controlling the print modes. But, it is the ink/paper interaction that has the dominant influence on print quality. Paper quality varies greatly depending on the manufacturing process. An ink, therefore, typically will interact differently with different commercial papers. It is desirable, however, that the ink produce high print quality independent of the print media.

Ink drying rate will strongly influence printer throughput. Ink jet printer throughput is relatively slow compared to printers using competing technologies, mainly due to "slow" drying rate of ink jet inks. Inks usually dry by two mechanisms: evaporation and penetration. Evaporation is determined by the vehicle vapor pressure, whereas penetration is determined by interfacial energy between the ink and the paper and the porosity of the paper.

Heating devices may be used to increase drying rate. Such devices, however, also accelerate solvent evaporation from the nozzles and may cause nozzle plugging. Heaters also add to the printer cost. Penetrating cosolvents and surfactants frequently are used to increase drying rate, but may degrade print quality by destabilizing the ink and/or increasing feathering.

Ink reliability issues include 1) decap or crusting time, which is the time a print head can stay dormant without failing to print; 2) drop volume consistency over pen life; 3) compatibility with the print head components; 4) long term storage stability and 5) robustness towards variable print parameters, such as the firing frequency and pulse width.

Methods to achieve these three primary ink attributes conflict with each other. For example, methods commonly used to increase drying rates, such as the addition of volatile cosolvents, either adversely affect print quality by causing increased feathering, or adversely affect reliability by causing the nozzle to be subject to crusting.

Accordingly, a need exists for improved inks that will produce high print quality on a wide range of papers typically used with ink jet printers, that are fast drying, and exhibit a high degree of reliability over extended storage times.

SUMMARY OF THE INVENTION

The present invention provides an aqueous ink particularly adapted for use with ink jet printers. The ink contains a polymer prepared from a fluorinated oxazoline or fluorinated oxazine, which enables the ink to effectively penetrate typical paper substrate employed in ink jet printing, achieving excellent drying times and print quality. Accordingly, the present invention provides an aqueous ink composition particularly adapted to meet the demanding requirements of ink jet printers, the ink composition comprising an aqueous carrier medium, a colorant, and approximately 0.005 to 10% by weight, based on the total ink composition, of a fluorinated block copolymer prepared from a fluorinated oxazoline or a fluorinated oxazine, the fluorinated block copolymer having a hydrophobic A block containing at least one fluorine atom and a hydrophilic B block.

DETAILED DESCRIPTION OF THE INVENTION

The ink jet ink compositions of this invention are particularly suited for use in ink jet printers in general, and thermal ink jet printers in particular. The ink compositions may contain a pigment and/or dye colorant. The inks may be adapted to the requirements of a particular ink jet printer to provide a balance of light stability, water fastness, smear resistance, optical density, drying rate, and low toxicity.

The fluorinated polymeric additives of this invention can also be used in an effective amount to balance the surface energies of two inks printed adjacent to each other. When a relatively low surface tension ink is printed adjacent to an ink with a relatively high surface tension, halo formation is commonly observed. "Halo formation" manifests itself in a white or weakly colored region, referred to as "halo", at the interface of two printing inks, or by the shrinking back of the printed ink from its original printed area. Halo is highly undesirable as it often results in a loss of optical density at the ink interface, or the loss of image quality at these interfaces.

FLUORINATED POLYMERS PREPARED FROM OXAZOLINES AND OXAZINES

The fluorinated polymeric additive is an AB, ABA, or BAB block copolymer, conveniently prepared from a 2-substituted-2-oxazoline, 2-substituted 1,3-oxazine, or mixture thereof. The A block contains at least one fluorine atom and is hydrophobic. The B block is hydrophilic, preferably water soluble.

The fluorinated polymeric additive is conveniently prepared from 2-substituted-2-oxazolines and/or 2-substituted 1,3-oxazines represented by the following structures, using the cationic polymerization process described in *Prog. Polym. Sci.*, Vol. 15, pages 751 to 823 (1990):

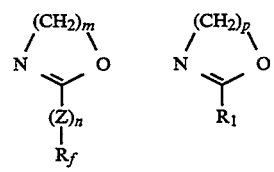

wherein:

m and p independently may be 2 (an oxazoline) or 3 (an oxazine);

Z is a divalent linking group represented by the formula —$R_2(L)_r$— wherein $R_2$ is a diradical of alkyl, alkenyl, aryl, or aralkyl containing 1 to 10 carbon atoms; L is an —O—, —S—, —C(O)—, —OC(O)—, —(O)CO—, —SC(O)—, or —$SO_2$—group; and r is 0 or 1;

n is 0 or 1;

$R_f$ is an alkyl, aryl, aralkyl, or alkylaryl group, containing 1 to 20 carbon atoms, wherein at least one hydrogen atom is replaced by fluorine; and $R_1$ is an alkyl group containing 1 to 3 carbon atoms, optionally substituted with one or more hydroxyl or ether groups, or an alkyl, aralkyl, aryl or alkylaryl group containing 3 to 30 carbon atoms and sufficient hydrophilic groups (e.g., hydroxy or ether groups) to render the B block hydrophilic or preferably water soluble.

Monomers meeting these structures may be used alone, or in admixture.

Effective initiators include (i) Lewis acids and their stable salts such as $BF_3OEt$, $AlCl_3$, $SbF_5$, and $Et_3O^+BF_4^-$; (ii) protonic acids such as $CF_3SO_3H$, $HClO_4$, and HBr; (iii) sulfonate esters and sulfonic anhydrides such $CF_3SO_3CH_3$, and $(CH_3SO_2)_2O$ (iv) alkyl halides such as $CH_3I$, and $C_6H_5CH_2Br$; and (v) electron acceptors such as tetracyanoethylene, and 7,7,8,8-tetracycnoquinodimethane. The AB block copolymers may be prepared by a "one-pot two-stage copolymerization" wherein the second block monomers are added to the same reaction pot after the first block monomers are substantially converted to polymer since the cationic polymerization is a living polymerization process. Alternatively, the AB block copolymers may be prepared in a "one-pot one-stage polymerization" process wherein all monomers are added at one time into the reaction pot provided that the reactivities of the monomers in the two blocks are significantly different. The fluorinated monomers usually have much lower reactivity than the corresponding non-fluorinated monomers. The ABA and BAB triblock copolymers can be prepared by a difunctional initiator and a two-stage polymerization process starting from the center block, or a multi-stage process wherein the blocks are built sequentially from one of the ends. The polymerization can be carried out in bulk or in solution. The resulting block copolymers have A and B blocks represented by the following formulae:

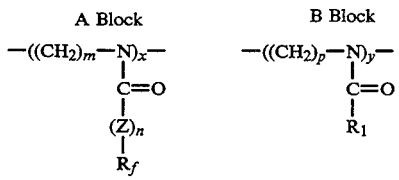

wherein:

x is 1 to 100, preferably 1 to 10;

y is 5 to 500, preferably 5 to 100; and the ratio y/x is 1 to 100, preferably 5 to 20.

When x is 1, a fluorinated oxazolinium salt, such as N-methyl-2-perfluoroalkylethyl-2-oxazolinium trifluoromethanesulfonate, can be used as an initiator in polymerizing 2-alkyl-2-oxazoline to yield the desired AB block copolymer. Alternatively, the water soluble B block can be synthesized first, and a fluorinated nucleophilic compound (such as an amine n-$C_7F_{15}CH_2CH_2CH_2NH_2$) then used to terminate the living ends to provide the fluorine containing A block.

Preferably, the fluorinated polyoxazoline is a poly[(N-3-n-perfluoroalkyl propionyl ethylenimine)-b-(N-propionylethylenimine)], wherein the perfluoroalkyl group has 4 to 12 carbon atoms and mixtures thereof. More preferably, the fluorinated polyoxazoline is poly[(N-3-n-perfluoroalkyl propionylethylenimine)-b-(N-propionylethylenime)] wherein the perfluoroalkyl group is a mixture of 70 mole % of perfluorooctyl and 30 mole % of perfluorodecyl or poly[(N-3-n-perfluorooctyl propionylethylenimine)-b-(N-propionylethylenimine)]. In these fluorinated polyoxazolines the degree of polymerization for the fluorinated block may be 1 (i.e., x=1) and the degree of the polymerization for the water soluble block may be 10 (i.e., y=10). Other typical variations include x is 2 and y is 20; and x is 3 and y is 30.

The fluorinated polymers selected to advantage in practicing the invention have a number average molecular weight below 20,000, preferably below 15,000, and typically in the range of 1,000–6000. The fluorinated polymer will be present in the range of approximately 0.005 to 10%, preferably 0.1 to 5%, by weight of the total ink composition. If the amount of the fluorinated copolymer becomes too high, the ink color density will be unacceptable and it will become difficult to maintain desired ink viscosity.

AQUEOUS CARRIER MEDIUM

The aqueous carrier medium is water or a mixture of water and at least one water-soluble organic component. Deionized water is commonly used. Representative examples of water-soluble organic solvents are disclosed in Ma et al, U.S. Pat. No. 5,085,698. Selection of a suitable mixture of water and water-soluble organic solvent depends upon requirements of the specific application, such as desired surface tension and viscosity, the selected pigment, drying time of the pigmented ink jet ink, and the type of media substrate onto which the ink will be printed. A mixture of a water-soluble organic solvent having at least 2 hydroxyl groups, e.g. diethylene glycol, and deionized water is preferred as the aqueous medium, water could comprise between 30% and 95%, preferable 60% to 95%, by weight based on the total weight of the ink.

COLORANT

The colorant may be a pigment dispersion or a dye. A pigment is a colorant that is applied in an insoluble particulate state. A dye is a colorant that is typically used in a soluble state. Disperse dyes may also be used. The term pigment dispersion, as is known in the art and as used herein, refers to a mixture of a pigment and a dispersing agent. Preferably, the dispersing agent is a polymeric compound.

Pigments;

A wide variety of organic and inorganic pigments, alone or in combination may be selected. For ink jet ink applications, the pigment particles need to be sufficiently small to permit free flow of the ink through the ink jet printing device, especially at the ejecting nozzles that usually have a diameter ranging from 10 to 50 microns. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is approximately 0.005 to 15 microns. Preferably, the pigment particle size should range from 0.005 to 1 micron.

The selected pigment may be used in dry or wet form such as presscake. Pigments are usually manufactured in aqueous media and the resulting pigment is obtained as water wet presscake. In the presscake form, the pigment is not aggregated to the extent that it is in dry form. Thus, pigments in the presscake form do not require as much deaggregation in the process of preparing the inks compared to the dry pigments. Representative commercial dry and presscake pigment that may be used in practicing the invention are disclosed by Ma et al. in U.S. Pat. No. 5,085,698.

In the case of organic pigments, the ink may contain up to approximately 30% pigment by weight, but will generally be in the range of approximately 0.1 to 15%, preferably approximately 0.1 to 5%, by weight of the total ink composition. If an inorganic pigment is selected, the ink will tend to contain higher weight percentages of pigment because inorganic pigments generally have higher specific gravities than organic pigments.

Dispersant:

Polymeric dispersants are the preferred dispersants for pigments. Suitable polymeric dispersants include random copolymers, block copolymers such as AB, BAB, and ABC block copolymers, and graft copolymers.

In AB or BAB block copolymers, the A block is a hydrophobic homopolymer or copolymer which serves to link with the pigment and the B block is a hydrophilic homopolymer or copolymer, or salts thereof, which serves to disperse the pigment in the aqueous medium. Such polymeric dispersants and their synthesis are disclosed in Ma et al., U.S. Pat. No. 5,085,698.

ABC triblock copolymers are also useful as pigment dispersants. In the ABC triblock copolymer, the A block is a polymer soluble in water, the B block is capable of binding to the pigment, and the C block is compatible with the organic components in the ink. ABC triblock copolymers and their synthesis are disclosed in Ma et al., EPO application 0556649 A1 published Aug. 25, 1993.

Although random copolymers can be used as dispersing agents, they are not as effective in stabilizing pigment dispersions as the block copolymers, and therefore are not preferred.

Dyes;

Dyes which are commonly used in aqueous ink jet inks such as acid dyes, basic dyes, direct dyes, food dyes, and reactive dyes are suitable colorants for the ink compositions of the present invention. Disperse dyes may also be suitable as colorants.

The color and amount of dye used in the ink are largely a function of choice, being primarily dependent upon the desired color of the print achieved with the ink and the dye's strength. Low concentrations of dyes may not give adequate color vividness. High concentrations may result in poor printhead performance or unacceptably dark colors.

The dye may be present in the amount of 0.01 to 20% by weight, preferably 0.05 to 8%, by weight, more preferably 1 to 5% by weight, based on the total weight of the ink.

OTHER INGREDIENTS

The ink may contain other ingredients. For example, a surfactant may be used in combination with the fluorinated additives of this invention to alter surface tension as well as maximize penetration. However, they may also destabilize the pigment dispersion for pigmented inks. The choice of a specific surfactant is also highly dependent on the type of media substrate to be printed. It is expected that one skilled in the art can select the appropriate surfactant for a specific substrate to be used in printing. In aqueous inks, the surfactants may be present in the amount of 0.01–5% and preferably 0.2–2%, based on the total weight of the ink composition.

Biocides may be used in the ink compositions to inhibit growth of microorganisms. Dowicides® (Dow Chemical, Midland, Mich.), Nuosept® (Huls America, Inc., Piscataway, N.J.), Omidines® (Olin Corp., Cheshire, Conn.), Nopcocides® (Henkel Corp., Ambler, Pa.), Troysans® (Troy Chemical Corp., Newark, N.J.) and sodium benzoate are examples of such biocides.

In addition, sequestering agents such as EDTA may also be included to eliminate deleterious effects of heavy metal impurities.

Other known additives, such as humectants, viscosity modifiers, may also be added to improve various properties of the inks.

INK PREPARATION AND INK PROPERTIES

The ink compositions of the present invention are prepared in the same manner as other ink jet ink compositions. If a pigment is used as the colorant, the dispersion is prepared by premixing the selected pigment(s) and dispersant in water. The dispersion step may be accomplished in a horizontal mill, a ball mill, a 2-roll mill, an attritor, or by passing the mixture through a plurality of nozzles within a liquid jet interaction chamber at a liquid pressure of approximately 10,000 psi to produce a uniform dispersion of the pigment particles in the aqueous carrier medium. The cosolvent(s) may be present during the dispersion step.

The dye based inks are prepared in a well agitated vessel to dissolve the ingredients rather than in a dispersing equipment.

It is generally desirable to make the ink jet inks in a concentrated form, which is subsequently diluted with a suitable liquid to the appropriate concentration for use in the ink jet printing device. By dilution, the ink is adjusted to the desired viscosity, color, hue, saturation density, and print area coverage for the particular application.

Jet velocity, separation length of the droplets, drop size, and stream stability are greatly affected by the surface tension and the viscosity of the ink. Inks suitable for use with ink jet printing systems should have a surface tension in the range of about 20 dyne/cm to about 70 dyne/cm and, more preferably, in the range of 25 dyne/cm to about 70 dyne/cm at 20° C. Acceptable viscosities are no greater than 20 cP, and preferably below 10 cP at 20° C. The ink has physical properties compatible with a wide range of ejecting conditions, i.e., driving voltage, driving frequency, and pulse width for thermal ink jet printing devices, driving frequency for the piezo element for either a drop-on-demand device or a continuous device, and the shape and size of the nozzles, etc. They may be used with a variety of ink jet printers such as continuous, piezoelectric drop-on-demand, and thermal drop-on-demand, and are particularly adapted for use in thermal ink jet printers. The inks have excellent storage stability for a long period and do not clog the nozzles. Fixing the ink on the media substrate, such as paper, fabric, film, etc., can be carried out rapidly and accurately.

The printed ink images have clear color tones, high density, excellent water resistance and lightfastness. Furthermore, the ink does not corrode parts of the ink jet printing device it comes in contact with, and it is essentially ordorless.

The following examples further illustrate, but do not limit, the invention.

EXAMPLES

Fluorinated polymers were prepared as follows:
Preparation of Polymer I:

5.35 g (10 mmol) of 2-(n-perfluorooctylethyl)-2-oxazoline, 9.58 g (97 mmol) of 2-ethyl-2-oxazoline, and 0.886 g (3.6 mmol) of N-methyl-2-methyl-2-oxazolinium trifluoromethanesulfonate as initiator were put into a dried 25-mL round-bottomed flask equipped with magnetic stirring and under argon atmosphere. The flask was placed in and oil bath at 80° C. and the mixture was stirred at this temperature until it solidified (10 min). Then the temperature of the bath was raised to 100° C. and the reaction mixture was kept at this temperature for 6 hours to finish off polymerization. After cooling to room temperature the polymer was dissolved in chloroform and precipitated into ethyl ether. The precipitate was filtered off, washed, and dried under vacuum at 50° C. overnight. 8.3 g of a slightly yellowish polymer were obtained. GPC (in HFIP against PET standards): $Mn=9,140$; $Mw=19,400$ Preparation of Polymer II:

Polymer II was prepared by the same procedure indicated above except that stronger stirring was used to achieve better mixing of the initial reaction mixture. 13 g of polymer were obtained. GPC (in HFIP against PET standards): $Mn=9,040$; $Mw=13,900$. Elemental analysis indicates that the copolymer has 19.6 % fluorine. This agrees well with the ratio of monomers in the feed. Preparation of Polymer III:

5.12 g (9.9 mmol) of 2-(n-perfluorooctylethyl)-2oxazoline, 10 mL (97 mmol) of 2-ethyl-2-oxazoline, and 1.25 g (5 mmol) of N-methyl-2-methyl-2-oxazolinium trifluoromethanesulfonate as initiator were put into a dried 25-mL round-bottomed flask equipped with magnetic stirring and under argon atmosphere. The flask was placed in and oil bath at 80° C. After 5 min at this temperature the reaction mixture became cloudy and very viscous. After 1 hr the temperature of the bath was raised to 100° C. and the reaction mixture was kept at this temperature for 4 more hours to finish off polymerization. Then the reaction mixture was dissolved in 25 mL of chloroform and poured into a solution of 1 g KOH in 150 mL of methanol to quench the polymerization and obtain hydroxyl end groups. All the operations were carried out under argon atmosphere. After stirring at room temperature for 1 hr the solvent was removed in a rotary evaporator and the obtained solid was redissolved in 25 mL of chloroform. This solution was filtered to remove insoluble KOH and then poured into ethyl ether to precipitate the polymer. The precipitate was decanted, washed with ether, and dried under vacuum at 50° C. overnight. 13 g of polymer were obtained. GPC (in HFIP against PET standards): $Mn=7,570$; $Mw=13,100$. Fluorine content by elemental analysis was 16.5%.

Preparation of Polymer IV:

This polymer contains only 1 repeat unit of fluorinated monomer since its triflate salt was used to initiate polymerization of 2-ethyl-2-oxazoline.

4 g (6 mmol) of N-methyl-2-(n-perfluorooctylethyl)-2-oxazolinium trifluoromethanesulfonate, and 6 g (60 mmol) of 2-ethyl-2-oxazoline were charged into a dried 25-mL round-bottomed flask equipped with magnetic stirring and under argon atmosphere. The flask was placed in and oil bath at 80° C. After 5 min at this temperature the reaction mixture was too viscous to stir. After 1 hr the temperature of the bath was raised to 100° C. and the reaction mixture was kept at this temperature for 4 more hours to finish off polymerization. Then the reaction mixture was dissolved in 25 mL of chloroform and poured into a solution of 1 g KOH in 150 mL of methanol to quench the polymerization and obtain hydroxyl end groups. All the operations were carried out under argon atmosphere. After stirring at room temperature for 1 hr the solvent was removed in a rotary evaporator and the obtained solid was redissolved in 25 mL of chloroform. This solution was filtered to remove insoluble KOH and then poured into ethyl ether to precipitate the polymer. The precipitate was decanted, washed with ether, and dried under vacuum at 50° C overnight. 6.9 g of polymer were obtained. GPC (in HFIP against PET standards): $Mn=5,440$; $Mw=6.540$. Fluorine content by elemental analysis was 21%.

Preparation of Polymer V:

In a dried 200-mL glass resin kettle equipped with reflux condenser, mechanical stirring, and under argon atmosphere were placed 57 g ( 80 mmol) of a mixture consisting of 70 mol % N-methyl-2-(n-perfluorooctylethyl)-2-oxazolinium trifluoromethanesulfonate and 30 mol % N-methyl-2-(n-perfluorodecylethyl)-2-oxazolinium trifluoromethanesulfonate, and 80 mL (800 mmol) of 2-ethyl-2-oxazoline. The oxazolinium salts were not soluble in 2-ethyl-2-oxazoline at room temperature and the mixture was warmed up slowly. At 50° C. the reaction mixture was clear and polymerization started. The reaction was exothermic and the temperature rose quickly to 80° C. After 30 min the mixture was too viscous to stir and the temperature was gradually raised to 100° C. over 5 hr to finish off polymerization. The product was dissolved in chloroform and precipitated in ethyl ether. After decanting and washing the polymer several times with ether, it was dried under vacuum at 50° C. overnight. 119 g of polymer were obtained. GPC (in HFIP against PET standards): $Mn=6,370$; $Mw=8,750$. Fluorine content by elemental analysis was 25.7%.

Pigment dispersants were prepared as follows: Poly(methacrylic acid-b-benzyl methacrylate-co-N,N-dimethylaminoethyl methacrylate-b-ethoxytriethylene glycol methacrylate), MAA//BzMA/DMAEMA//ETEGMA (12//12/3//4): (Note: A double slash indicates a separation between the blocks and a single slash indicates a random copolymer. The values recited in parenthesis represent the degree of polymerization for each monomer.)

To a vigorously stirred solution of 148.8 g (0.64 mol) of 1,1-bis(trimethylsiloxy)-2-methyl-l-propene and 5.0 mL of tetrabutyl ammonium m-chlorobenzoate (1.0M solution in acetonitrile) in 2900 mL THF was slowly added 1213.4 g (7.68 mol) of trimethylsilyl methacrylate in 30 minutes under nitrogen atmosphere. The temperature rose from 22.4° C. to 53.2° C. during the course of the addition. When the temperature fell to 47.2° C. 40 minutes later, 0.5 mL of tetrabutyl ammonium m-chlorobenzoate solution was added. No exotherm was detected. To the reaction mixture was then slowly added a mixture of 1353.2 g (7.68 mol) of benzyl methacrylate and 301.9 g (1.92 mol) of N,N-dimethylaminoethyl methacrylate (dried over molecular sieves) in 45 minutes. The temperature rose to 65.2° C. during the course of the addition. When the temperature fell to 57.2° C. about 45 minutes later, 0.5 mL of tetrabutyl ammonium m-chlorobenzoate was added and no exotherm was detected. To the reaction mixture was then added 630.5 g (2.56 mol) of ethoxytriethyleneglycol methacrylate (dried over molecular sieves) over 10 minutes. The reaction mixture was stirred for 3.5 hours. It was quenched with 580 mL of methanol and stirred overnight. The volatiles were distilled off while 2-pyrrolidone was added to displace the solvent to give 6675 g of a 44% polymer solution in 2-pyrrolidone.

The block polymer was neutralized using the following procedure. 795.5 g of the polymer solution were mixed with 108.5 g of potassium hydroxide solution (45.4% in deionized water) and 2596 g of deionized water until a homogeneous 10% polymer solution was obtained.

Preparation of pigment dispersion using block polymer MAA//BzMA/DMAEMA//ETEGMA (12//12/3//4):

A black pigment dispersion was prepared using the following procedure:

| Ingredient | Amount (parts by weight) |
|---|---|
| FW18, Carbon black pigment (Degussa Corp., Allendale, NJ 07041) | 100 |
| Polymer dispersant obtained from above, (10% solution) | 500 |
| Deionized water | 400 |
| Total | 1,000 |

The above mentioned components were premixed in a plastic beaker by mechanical stirring until no lumps or dry clumps were visible. The mixture was dispersed in a microfluidizer (Microfluidics Corp., Warham, Mass.) by passing it through the interaction chamber 5 times under a liquid pressure of about 8,000 psi. The resulting pigment dispersion had a 10% pigment concentration with an average particle size of 111 nm as determined by Brookhaven BI-90 particle sizer. The dispersion was filtered through a 1 micron high efficiency filter bag (3M Filtration Products, St. Paul, Minn. 55144-1000). The final pH was 7.8.

Ink Preparation And Testing:

The above pigment dispersion concentrate was formulated with appropriate amounts of Liponics ® EG-1, 2-pyrrolidone and the fluorinated additive of this invention to produce ink samples listed in Table 1. All inks including the control contain by weight 3.5% pigment, 1.75% polymer dispersant, 8.0% Liponics ® EG-1, and 10% 2-pyrrolidone. Ink samples (Ink #2-7) contain additional amounts of the fluorinated additives. The inks were placed into the ink reservoir of thermal ink jet pens and loaded on a Hewlett Packard DeskJet ink jet printer (Hewlett Packard Co., Palo Alto, Calif.). A solid black area, alphanumerical letters in various fonts and sizes, and dot patterns were printed on Gilbert bond paper (25% cotton, Mead Co., Dayton, Ohio). The optical density (OD) was measured on the solid area by an X-Rite ® densitomer, model 418 (X-Rite, Inc., Grandville, Mich.). The print quality (PQ) was judged on the edge acuity and uniformity of the density.

The drytime was measured by the following procedure. A row of 0.4 cm × 1 cm rectangular solid blocks were printed on the paper. These ink blocks were rubbed across and into the white area adjacent to it with a finger through a rubber finger cot, 2 ¾" thickness (VWR Scientific Co.) periodically. The rubbing action is carried out as consistently as possible. The time required for no ink to be transferred to the white area is reported for each ink on 3 different papers in Table 1.

Waterfastness was determined by printing a series of ⅛" solid bars with ⅜" spacings in between on Gilbert bond paper. With the print sample held at 45 degrees, 0.25 mL of water was dripped across the bars on the print sample. Ink transfer to the white spacing was used as a measure of the water resistance.

TABLE 1

| Ink # | Additive | Surface Tension (dynes/cm)$^a$ | OD | PQ | Stability (before/after, nm) | Dry Time (sec) GB/SH/HM$^b$ |
|---|---|---|---|---|---|---|
| 1$^c$ | — | 57.5 | 1.63 | Excellent | 112/114 | 80/15/90 |
| 2 | Polymer I, 0.5% | 33.4 | 1.54 | Excellent | 127/116 | 80/25/40 |
| 3 | Polymer I, 1.0% | 32.0 | 1.54 | Excellent | 118/114 | 55/25/30 |
| 4 | Polymer IV, 0.5% | 33.0 | 1.54 | Excellent | 115/118 | 60/50/05 |
| 5 | Polymer IV, 1.0% | 32.1 | 1.55 | Excellent | 118/119 | 55/50/10 |
| 6 | Polymer V, 0.5% | 33.8 | 1.54 | Excellent | 119/115 | 70/55/25 |
| 7 | Polymer V, 1.0% | 32.1 | 1.52 | Excellent | 123/117 | 80/15/15 |

$^a$The surface tension was measured on a Fisher Surface Tensiomat ®, Fisher Scientific Company, Springfield, NJ.
$^b$GB = Gilbert ® bond paper
SH = Springhill ® Relay DP paper, International Paper Co., Lock Haven, PA
HM = Hammermill ® Fore DP paper, International Paper Co., Lock Haven, PA
$^c$Control All experimental inks of this invention have lower surface tension, and improved interaction with various papers, which led to improved dry time in general. No compromise of print quality was observed. The inks of the invention exhibited neutral black hue and sharp edge acuity, and become 100% waterfast as soon as the inks were dry to the touch.

The stability of all sample inks was confirmed by measuring the particle size change in nm on a Brookhaven ® BI-90 particle sizer after the ink samples had been subjected to 4 temperature cycles, each cycle consisting of 4 hours at −20° C. and 4 hours at 70° C. The change was within experimental error for all inks.

All experimental inks were extremely friendly and reliable in terms of decap or crusting performance and smooth printing for long periods of time.

What is claimed is:

1. An ink composition comprising an aqueous carrier medium, a colorant, and approximately 0.005 to 10% by weight, based on the total ink composition, of a fluorinated block copolymer prepared from a fluorinated oxazoline or a fluorinated oxazine, said fluorinated block copolymer having a hydrophobic A block containing at least one fluorine atom and a hydrophilic B block.

2. The ink composition of claim 1 wherein said A and B blocks are represented by the formulae:

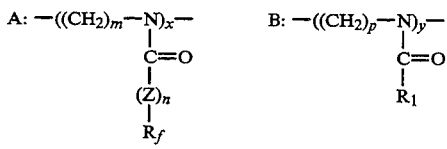

wherein x is 1 to 100; y is 5 to 500; the ratio y/x is 1 to 100; m and p independently are 2 or 3; Z is a divalent linking group; n is 0 or 1; $R_f$ is a hydrocarbon group having 1 to 20 carbon atoms and at least 1 fluorine atom; and $R_1$ is a hydrocarbon group optionally containing hydrophilic groups.

3. The composition of claim 2 wherein said copolymer is an AB, ABA, or BAB block copolymer.

4. The composition of claim 2 wherein divalent linking group Z is represented by the formula $-R_2(L)_r-$ wherein $R_2$ is a diradical of alkyl, alkenyl aryl, or aralkyl containing 1 to 10 carbon atoms; L is an $-O-$, $-S-$, $-C(O)-$, $-OC(O)-$, $-(O)CO-$, $-SC(O)-$, or $-SO_2-$ group; and r is 0 or 1.

5. The ink composition of claim 2 wherein $R_1$ is an alkyl group containing 1 to 3 carbon atoms, optionally substituted with one or more hydroxyl or ether groups, or an alkyl, aralkyl, aryl or alkylaryl group containing 3 to 30 carbon atoms and sufficient hydrophilic groups to render the B block hydrophilic.

6. The ink composition of claim 5 wherein said hydrophilic groups are hydroxy or ether groups, and the B block is water soluble.

7. The ink composition of claim 2 wherein x is 1 to 10, y is 5 to 100, and the ratio y/x is 5 to 20.

8. The ink composition of claim 7 wherein the fluorinated polymer has a number average molecular weight below 15,000.

9. The ink composition of claim 8 wherein said fluorinated polymer is present in the amount of approximately 0.1 to 5% by weight of the total ink composition.

10. The ink composition of claim 9 wherein the fluorinated polymer is a poly[(N-3-n-perfluoroalkyl propionyl ethylenimine)-b-(N-propionylethylenimine)]- wherein the perfluoroalkyl group has 4 to 12 carbon atoms.

11. The ink composition of claim 10 wherein said perfluoroalkyl group is a mixture of 70 mole % of perfluorooctyl and 30 mole % of perfluorodecyl.

12. The ink composition of claim 10 wherein the fluorinated polymer is poly[(N-3-n-perfluorooctyl propionylethylenimine)-b-(N-propionylethylenimine)].

* * * * *